United States Patent [19]

Hagino et al.

[11] 4,435,673
[45] Mar. 6, 1984

[54] DC BRUSHLESS MOTOR AND ITS DRIVING CONTROL SYSTEM

[75] Inventors: Hiroshi Hagino, Omiya; Kuniyoshi Nakamura; Eiichi Kotake, both of Yono, all of Japan

[73] Assignee: Japan Servo Co., Tokyo, Japan

[21] Appl. No.: 240,225

[22] Filed: Mar. 3, 1981

[30] Foreign Application Priority Data

Jun. 11, 1980 [JP] Japan .................................. 55-78520

[51] Int. Cl.³ ............................................ H02K 29/00
[52] U.S. Cl. ................................. 318/254 A; 318/138
[58] Field of Search .................... 318/138, 254 A, 254

[56] References Cited

U.S. PATENT DOCUMENTS 3,783,359  1/1974  Malkiel ................................ 318/254
4,135,120  1/1979  Hoshirin et al. ..................... 318/138
4,258,299  3/1981  Takeda et al. ....................... 318/258

*Primary Examiner*—J. V. Truhe
*Assistant Examiner*—Saul M. Bergmann
*Attorney, Agent, or Firm*—Birch, Stewart, Kolasch & Birch

[57] ABSTRACT

A direct current brushless motor is structured by fixing a ring-shape magnetic rotor to a rotor shaft in one piece by way of the magnet yoke, and by arranging the position of the insulating plate on which the magnetic induction elements for detecting the magnetic field of the rotor magnet, stator windings and the rotor yoke are installed, so as to have the rotor magnet oppose the stator windings across an air gap. The stator windings are composed of delta connection wirings and the windings of each phase are placed on a concentric circle having the rotor shaft at its center and in a position dividing the said circle in equiangular areas.

The magnetic induction elements are provided in three with the first, second and third elements being respectively fixed at the positions where their respective phases are advanced by $\pi/6$ radian in the electric angle from the respective centers of the first phase, second phase and third phase coils. These magnetic induction elements pick up only the plus-side output signals and let the current flow respectively to the aforesaid three-phased stator windings through an amplifier, whereby they form a driving circuit for driving said rotor shaft.

4 Claims, 13 Drawing Figures

DC BRUSHLESS MOTOR AND ITS DRIVING CONTROL SYSTEM

BACKGROUND OF INVENTION

The present invention relates to the D.C. brushless motor and its driving control system, and, in particular, to the D.C. brushless motor and its driving control system which are suitable for use as the driving source of a magnetic disc driving system that drives a disc-shaped recording medium for the write-in and read-out of information through relative motion against a detector.

Figure 1A:
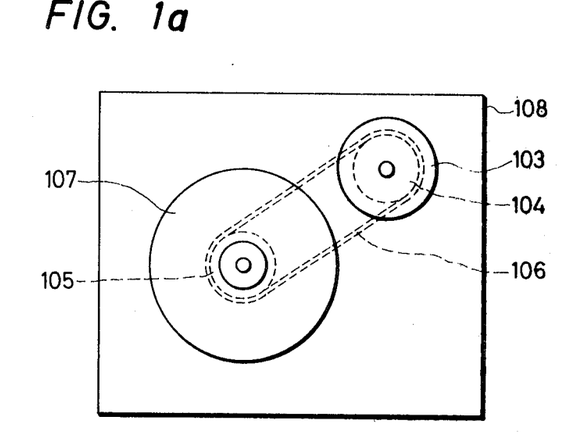
FIG. 1 is a drawing showing the magnetic disc driving system of a conventional type.
Figure 1B:
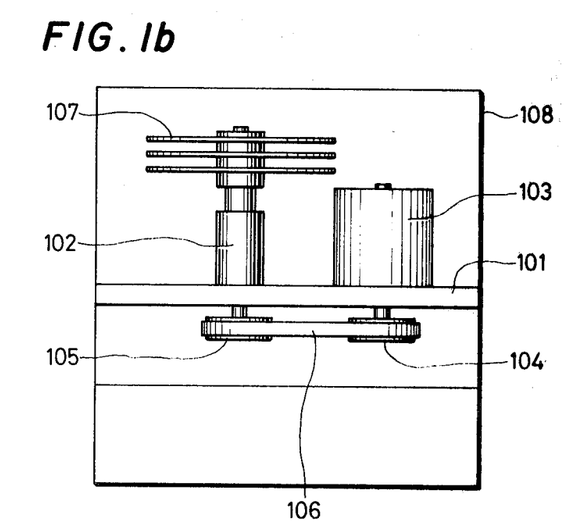

Prior art is described hereinafter along FIGS. 1 through 5. FIG. 1 is to help explain one example of conventional magnetic disc driving system, and (a) exhibits its top view while (b) shows its side view. In the FIG. 1, 101 is the base board which is fixed to the outer case 108 covering the whole device; 102 is the bearing part which holds the axle of the magnetic disc 107; 103 is an electric motor for driving the system, while 104 and 105 are the pulleys respectively and 106 is the belt. The revolution of the driving motor 103 is transmitted to the magnetic disc 107 by way of the pulley 104, belt 106 and pulley 105, and drives the magnetic disc 107 to rotate at a certain set revolution speed, whereby information is written in to or read out from the magnetic disc 107 by means of the magnetic head (not shown in the drawing) which is installed close to the magnetic disc 107.

The function of the driving motor 103 as shown in FIG. 1 is to rotate the magnetic disc at a certain set revolution speed, but conventionally in most cases induction motors have been employed as the driving motor 103. The conventional driving system, however, which drives the machine by the induction motor, pulley and belt, involved a number of problematic points. To illustrate some of the problems, the conventional driving system requires an adjustment in the revolution speed of magnetic disc to fit the frequency of the power source employed by changing the pulley's diameter according to the frequency as the synchronous speed of induction motor varies according to the frequency of the power source employed. The conventional driving system further requires special design to meet such complex forces as the strong side pressure and axlewise load which the bearings of the motor axle and the magnetic disc axle receive due to the strong tension added to the belt in order to prevent slipping between the pulleys and the belt. The conventional system also generates a large loss of power by the strong set-in pressure and side pressure added to the transmission loss of the belt thus requiring an induction motor with a far greater capacity than its actual net power. The conventional system also requires much longer time from start of the magnetic disc's rotating movement to reach a stable rotating speed as it drives the magnetic disc which has a rather large inertia moment whereby the loss of time and power it suffers is rather substantial. Furthermore, as the conventional system employs a driving system dependent upon pulleys and a belt, the interior of the outer case is contaminated by flying dust generated from the worn-out belt, and it necessitates such designings as to shut off the air flow between the driving compartment and the magnetic disc compartment, while in addition it requires such upkeep as frequent replacement of belt and cleaning of accumulated dust, which detract its operating efficiency. As such, the conventional induction motor driving system embraced numerous problems.

Figure 2:
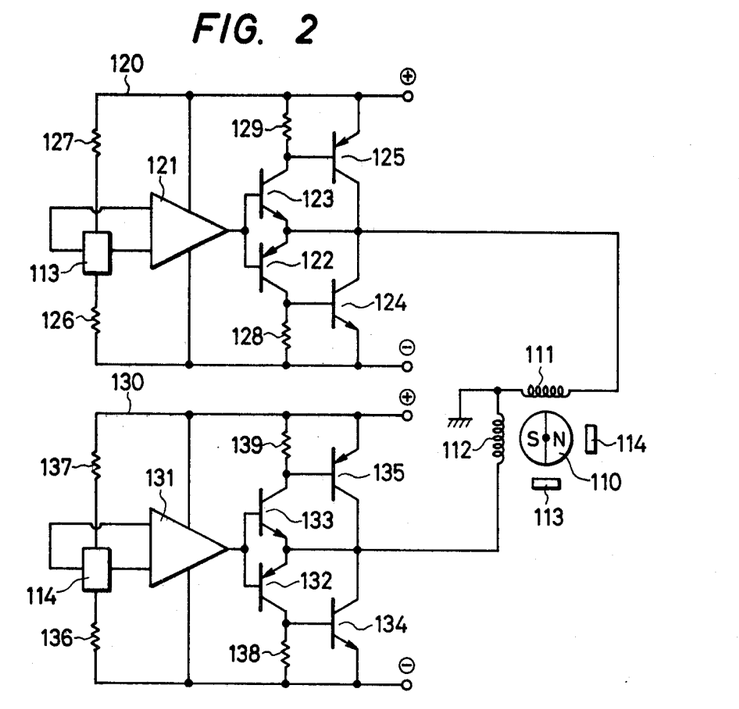
FIG. 2 is a drawing showing the driving circuit of a conventional D.C. brushless motor.

In order to cope with these problems, conventionally a procedure has been employed, wherein an motor directly drives the magnetic disc or recording cylinder by way of using the same axle for the rotating axle of the magnetic disc or recording cylinder and simultaneously for the driving axle of the D.C. brushless motor without using any pulley-and-belt transmission system. FIG. 2 shows one example of the driving circuit of the D.C. brushless motor which is conventionally employed for driving the turntable of record players. In FIG. 2, 110 is the rotor magnet and 111 and 112 are stator coils respectively which are placed in respective positions opposing the rotor magnet 110 across air gap while the stator coils 111 and 112 are so arranged in their respective positions as to be at 90 radian to each other in the electric angle. Elements 113 and 114 are magnetic induction elements respectively, e.g. Hall elements, which are placed close to the stator coils 111 and 112, the magnetic induction element 113 being placed in a position where an output voltage of almost sine-wave to the rotating angle of the rotor 110 is made available almost at the center of the stator coil 111 of the first phase, and it forms the circuit connection which facilitates the amplification of the output voltage of this magnetic induction element 113 by the amplifier 120 before the current flows to the stator coil 111. Similarly, the magnetic induction element 114 is placed in a position where an output voltage of almost cosine-wave to the rotating angle of the rotor 110 is made available almost at the center of the stator coil 112 of the second phase, and it forms a circuit connection which facilitates the amplification of the output voltage of this magnetic induction element 114 by the amplifier 130 before flowing to the stator coil 112. Furthermore, in the example shown in FIG. 2, the amplifier 120 is composed of an operating amplifier 121, four transistors 122, 123, 124 and 125 and four resistors 126, 127, 128 and 129, while the amplifier 130 is composed of an operating amplifier 131, four transistors 132, 133, 134 and 135 and four resistors 136, 137, 138 and 139.

Figure 3:
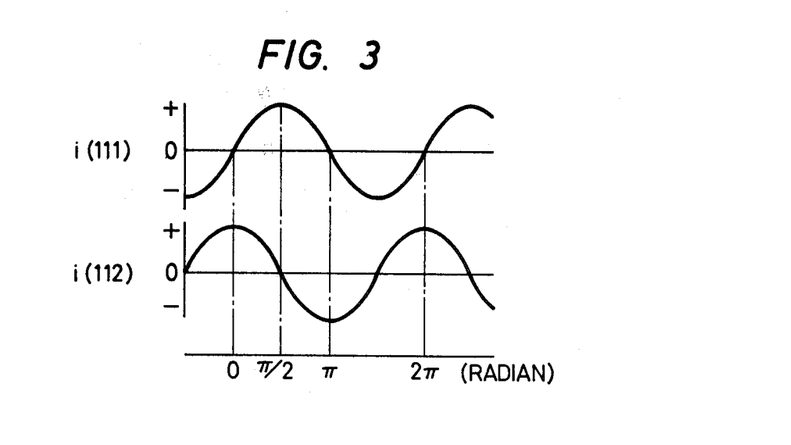
FIG. 3 is a drawing showing the relation between the rotating angle of the rotor shown in FIG. 2 and its coil current.

FIG. 3 is the chart which illustrates the relations of the rotating angle of the rotor 110 of a brushless motor with the current i (111) which flows through the stator coil 111 of the first phase and the current i (112) which flows through the stator coil 112 of the second phase, and between the currents i (111) and i (112) there is a phase difference of 90 degrees. The output torque in this case is expressed as $T_1 = K \cdot \sin^2 \theta$, $T_2 = K \cdot \cos^2 \theta$, $T_0 = K \cdot (\sin^2 \theta + \cos^2 \theta) = K$, where $\theta$ is the rotating angle of the rotor 110, $T_1$ is the torque generated by the stator coil of the first phase, $T_2$ is the torque generated by the stator coil of the second phase, $T_0$ is the compound torque and K as the constant, and the torque becomes constant irrespective of the rotating angle $\theta$ of the rotor 110, so that, if it is used for driving the turntable of a record player, it facilitates minimizing uneven rotation.

The conventional example as shown in FIG. 2, however, was not free from the following problematic points. Namely, in order to make the conventional example exhibited in FIG. 2 absolutely free from any uneven rotation and to sustain the operation with a constant torque, it is imperative that the respective outputs of the magnetic induction elements 113 and 114 should be entirely, in a opposite direction to each other, and the two stator coils 111 and 112 should be in a perfectly identical shape while locating their respective positions at the phase difference of exactly 90 degrees, and that the relative positions between the stator coils and the magnetic induction elements should be kept precise and correct. In the practical version of such electric motors, however, the aforesaid various features and incorrect relative position are in reality being supplemented or corrected by various adjusting contrivances in order to minimize the unevenness in rotation.

The point which bears a specific importance among them is the fact that the characteristic feature of the output of the magnetic induction elements in the plus direction differs from that in the minus direction and to locate these elements in their accurately correct positions is very difficult, and the inconveniencies accruing therefrom generate a difference in torque in the two directions thereby causing a widely uneven torque. In order to supplement this, adjustment can only be made by checking the characteristic feature of each magnetic induction element, which is the one reason impeding their mass-production.

Furthermore, in the structure of the conventional example in FIG. 2, as it is necessitated to flow a sine-wave current through the stator coils, the amplifiers 120 and 130 have to be operative in a linear range, which raise the problem of current efficiency. For the improvement of the efficiency, expanding the operating range of the amplifiers from the linear range to the saturating range works out, i.e. to convert it to the switch-drive system, but conversion to the switch-drive system with the structure as per FIG. 2 remaining unchanged brings about an inconvenience of causing a big vibration noise due to an amplified torque fluctuation.

Figure 4:
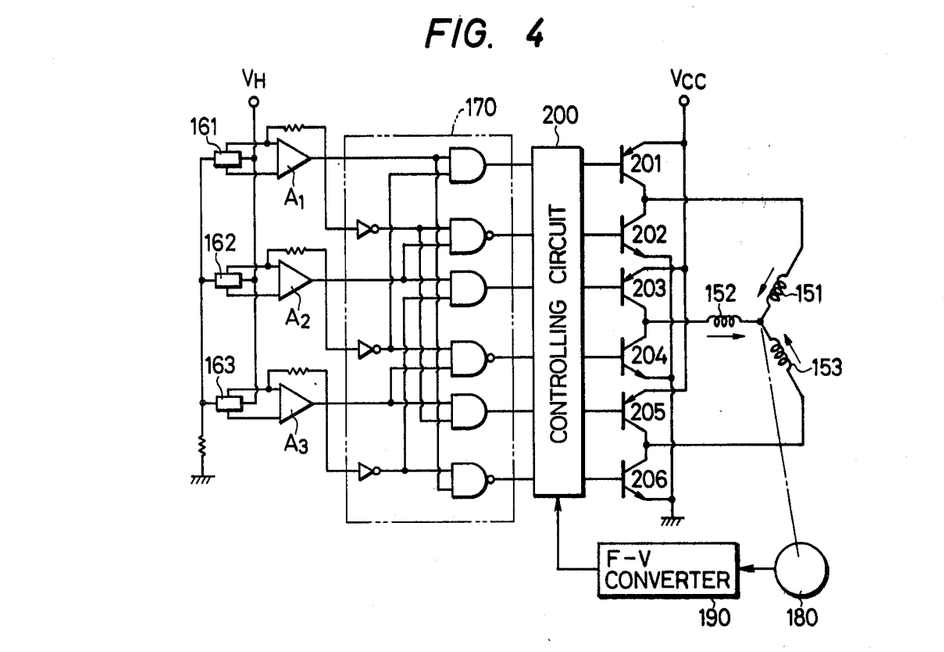
FIG. 4 shows one example of a conventional improved circuit.
Figure 5:
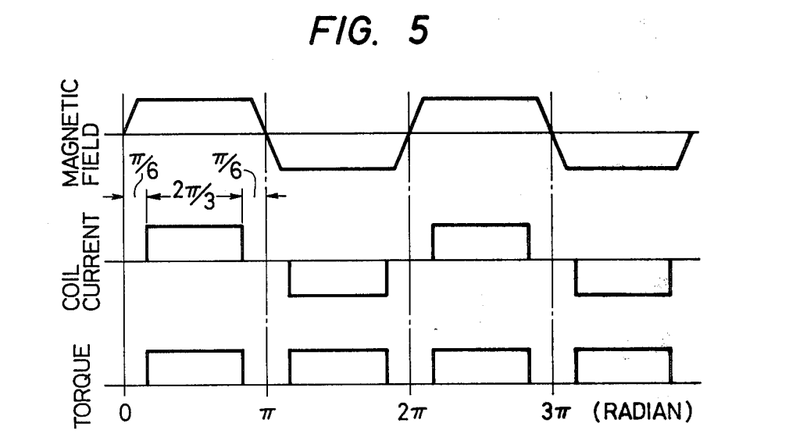
FIG. 5 is a drawing showing the relations of the magnetic induction element output, coil current and torque with the rotor's rotating angle of FIG. 4.

To cope with this problem, conventionally suggested was a three-phase driving circuit, which puts together three sets of a single-phase driving system, with each of them is composed of one each of magnetic induction element, amplifier and stator coil, and the alignment pitch of the coil of each phase is set at 120° to each other. FIG. 4 is the drawing showing one example of this kind of conventional circuit. In FIG. 4, 151 is the stator coil of the first phase, 152 is the stator coil of the second phase and 153 is the stator coil of the third phase; 161, 162 and 163 respectively are the magnetic induction elements arranged correspondingly to the stator coils 151, 152 and 153; $A_1$, $A_2$ and $A_3$ respectively are the amplifiers which amplify the output of the respective magnetic induction elements; 170 is a 120° logic circuit; 180 is the velocity generator which detects the frequency signals proportionate to the rotating speed of the rotor of the D.C. brushless motor; 190 is the frequency-voltage converter which converts the output frequency signals of the velocity generator 180 into direct current voltage signals; 200 is the current control circuit that puts out currents i (151), i (152) and i (153) which flow to the stator coil of each phase 151, 152 and 153 upon receiving the output signals from the 120° logic circuit 170 as input and the frequency-voltage converter 190; 201 through 206 is the group of transistors amplifying the output of the current control circuit 200; $V_H$ is the Hall bias source when a Hall element is employed as a magnetic induction element, while Vcc is the driving voltage source of the transistor group 201 through 206. The circuit as per FIG. 4 is so structured as to detect the magnetic field of the rotor by positioning the magnetic induction elements 161, 162 and 163 close to the stator coils 151, 152 and 153 respectively and feed the relative input to the 120° logic circuit by way of amplifiers $A_1$, $A_2$ and $A_3$, the output of which then is fed to the three-phase stator coils 151, 152 and 153 after being amplified by the three-phase bipolar driven amplifier which is composed of the transistors 201 through 206. FIG. 5 exhibits the relations, in a single phase, of the current flowing through the magnetic induction elements and the stator coil of each phase and torque with the rotating angle of the rotor in the circuit demonstrated in FIG. 4.

The difference between the structures of the conventional example in FIG. 2 and that of the conventional example in FIG. 4 are in part that the former is a two phase motor while the latter motor has three phases. Therefore, the structure of FIG. 4 is provided with a 120° logic circuit which controls current flow in relation to rotor position as the stator coil is fed with current every 120° derived from the 180° output of the magnetic induction elements both on the plus side and the minus side. In the structure of FIG. 2 on the other hand the outputs of the magnetic induction element on the plus and minus sides spanning 180° are amplified as is and are fed to the stator coil. In order to start feeding current which continues its flow for the period of 120° from the start-up point of the output signals from the magnetic induction element, the magnetic induction element is arranged in the position where its phase is advanced by $\pi/6$ radian or $\pi/6 + n\pi$ radian in the electric angle from the center of its corresponding stator coil. As shown in FIG. 5, as against the magnetic field which is generally magnetized in a block-type, the coil current flows at the almost flat center 120° part so that the torque is expressed in a flat value as the product of the magnetic field and the current. FIG. 5 exhibits this only for one single phase, but the torque compounding the torques of these three phases also has a lesser torque ripple. Even if there exists a slight discrepancy in the positioning of each magnetic induction element or coil, it only necessitates a slight move-up or -down of the switching point of the current and it does not produce any reverse torque, so that it presents no possibility of producing any large torque ripple. The system of the conventional example shown in FIG. 4, however, performs a 120° flow of current, so it required a 120° logic circuit and had a problem of making its circuit complicated.

BRIEF SUMMARY OF INVENTION

The objective of the present invention is to solve various problems existed in the aforesaid prior art, and, in particular, to offer the D.C. brushless motor and its drive-control system which suit to the driving systems of magnetic disc.

The D.C. brushless motor under the present invention is equipped with the hub to which the device to be driven is attached, the rotor axle which is directly connected to the lower part of this hub coaxially and supported by the motor base board by way of a bearings to permit its free rotation, the magnet yoke that attaches the ring-shape rotor magnet which is magnetized with multiple poles toward their end direction to the aforesaid rotor axle in one-piece, and the insulating plate which is attached to the aforesaid, motor base board. The stator coils are attached to the aforesaid insulating plate and are arranged in their respective positions so as to have them oppose the aforesaid rotor magnet across an air gap and the magnetic induction elements for detecting the magnetic field generated by the aforesaid rotor magnet as well as the stator yoke. The driving circuit which drives the aforesaid rotor axle is made up by connecting each of the aforesaid stator coils to form a three-phase delta-shaped wirings, with the coil of each phase being composed of an N number (N represents one of 1, 2, 3 ... or p and p represents the number of magnetic poles) of element coils; by arranging these 3N number groups of element coils on a concentric circle having the rotor axle at its center with their respective positions dividing the said circle in equal proportion at each 360/N°; by connecting the element coils each other within one group in series or parallel circuit so as to make it as the coil forming each phase; by installing the aforesaid magnetic induction element in three in its number, with the first element being placed in the position where its phase is advanced by $\pi/6$ radian from the center of the first phase coil, the second element being placed in the position where its phase is advanced by $\pi/6$ radian in the electric angle from the center of the second phase coil and the third element being placed in the position where its phase is advanced by $\pi/6$ radian in the electric angle from the center of the third phase coil respectively; and by having these magnetic induction elements pick up only the plus-side output signals and letting the current flow respectively to the aforesaid three-phased stator coils in order by way of the amplifier.

DETAILED DESCRIPTION OF INVENTION

Figure 6:
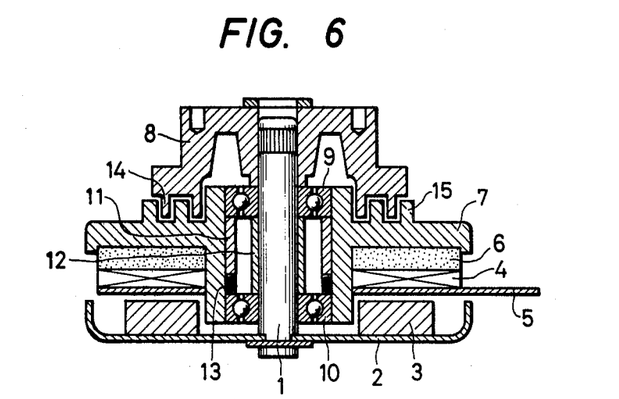
FIG. 6 is the vertical cross-section of one example of the present invention.

Examples of the present invention are explained hereinafter aided by FIGS. 6 through 13. FIG. 6 is a drawing showing a vertical cross-section exhibiting one example of the D.C. brushless motor of the present invention, and this is the case of a D.C. brushless motor to be used for driving the magnetic disc driving system of a direct driving type. In FIG. 6, 1 is the driving axle, 2 is the magnet yoke, 3 is the rotor magnet, 4 is the stator coil, 5 is the insulating plate holding the stator coil 4, 6 is the stator yoke made of ferrite, 7 is the motor base board, 8 is the hub to which the magnetic disc is to be mounted, 9 and 10 are the ball bearings, 11 is the spacer, 12 is the collar, 13 is the spring for pre-loading 14 is the fold for a labyrinth on the side of the hub to which a magnetic disc is mounted, 15 is the fold for a labyrinth on the side of the motor base board. On the upper side of the hub 8 for mounting a magnetic disc, a disc (not shown in the drawing) is to be mounted in a detachable way. The rotor axle 1 is the driving axle of the motor and simultaneously serves as the driving axle for rotating the hub 8 to which a magnetic disc is to be mounted on. The rotor magnet 3 is made in a shape of ring, and its lower end is fixed fast to the magnet yoke (2), which is attached to the rotor axle 1 so as to let it rotate together with the rotor axle 1 in one piece. The top end of the rotor magnet 3 is magnetized with multiple poles as exemplified in FIG. 7 (8 poles in the example shown). The stator yoke 6 is fixed to the motor base board 7 and on the other end of this stator yoke 6 the insulating plate 5 to which the stator coil 4 and the magnetic induction element are mounted is installed so as to have this insulating plate 5 face against the rotor magnet with air gap in between. The rotor axle 1 is supported by the motor base board by means of ball bearings 9 and 10 to permit it to rotate freely. The spacer 11 is fixed fast to the motor base board by the screws not shown in the drawing.

Figures 7, 8:
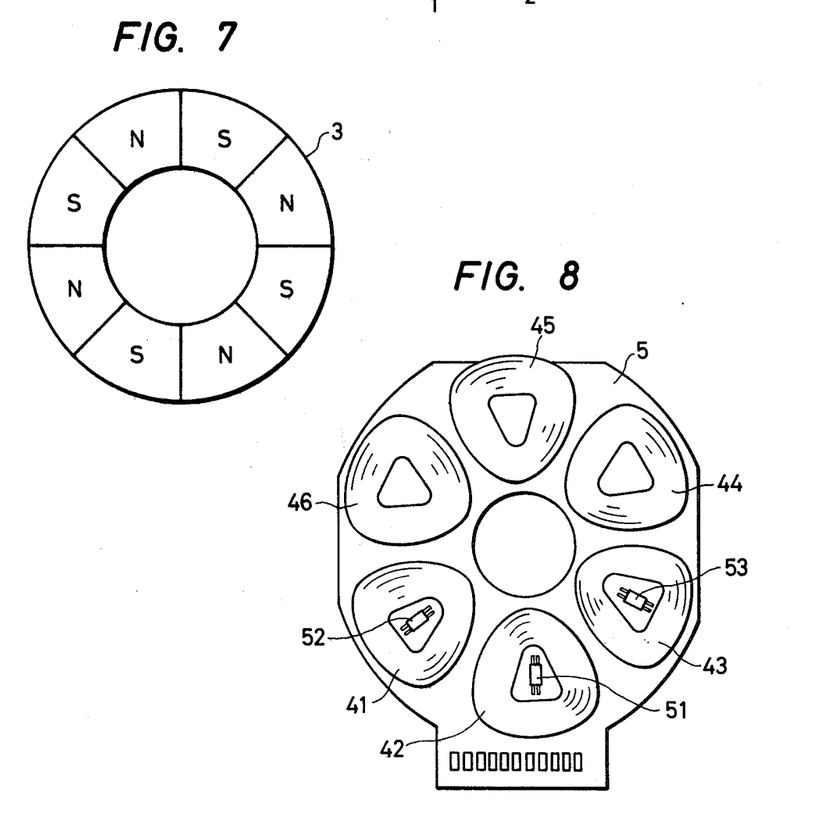
FIG. 7 is a drawing showing the magnetized status of the rotor magnet shown in FIG. 6.
FIG. 8 is the top view of the insulating plate shown in FIG. 6.

FIG. 8 is a drawing showing one example which illustrates how the stator coils and the magnetic induction elements are mounted on the insulating plate 5, where the number of the element coils 41 through 46 of the stator coil is six and the number of the magnetic induction elements 51, 52 and 53 is three. Should the number of the element coils be represented by 3N, the example cited is the case where N=2. The group of coils $W_3$ of the third phase is formed by connecting the element coil 41 to the element coil 44 which is in a position 360/N, namely 180°, as measured from the position of the element coil 41 holding it as the starting point in series or in parallel so as to magnetize both with the same polarity, and similarly the group of coils $W_1$ of the first phase is formed by connecting the element coil 42 to the element coil 45 in series or in parallel so as to magnetize both with the same polarity, and also the group of coils $W_2$ of the second group is formed by connecting the element coil 43 to the element coil 46 in series or in parallel so as to magnetize both with the same polarity. If the connecting point of the lead-out of the third phase coil group $W_3$ and the lead-in of the first phase coil group $W_1$ is designated as point U, and the connecting point of the lead-out of the first phase coil group and the lead-in of the second phase coil group $W_2$ is designated as point V, while the connecting point of the lead-out of the second phase coil group $W_2$ and the lead-in of the third phase coil group is designated as point W, it forms a three-phase delta-shaped motor coil with the three vertexes of thus formed triangle being designated as points U, V and W respectively.

Figure 9:
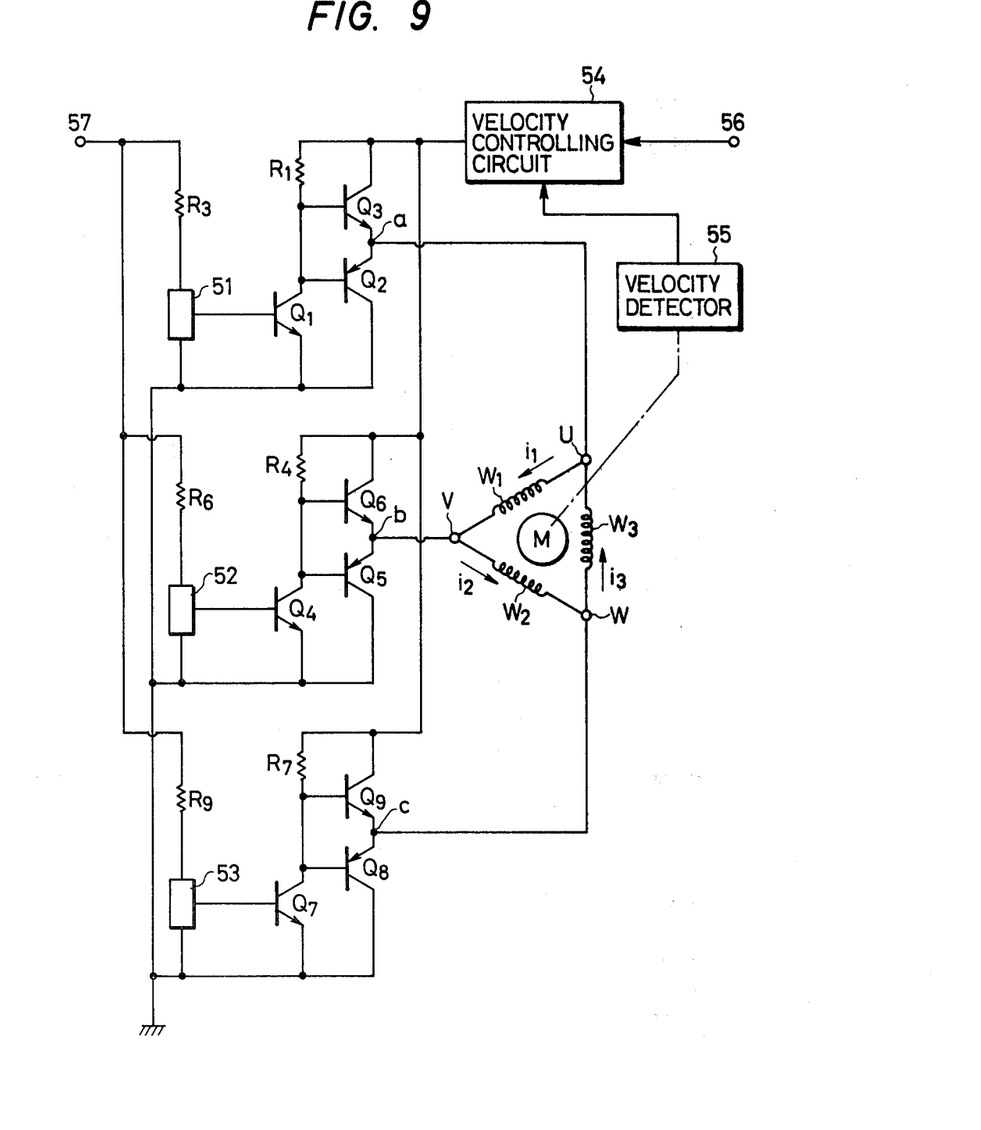
FIG. 9 is a drawing showing one example of the driving circuit of the present invention.

FIG. 9 is showing one example of the driving control circuit of the D.C. brushless motor under the present invention. $Q_1$, $Q_2$ and $Q_3$ respectively are the transistors which are the structural elements of the first complementary amplifier. The output of the magnetic induction element 51 is fed into the base terminal of the input transistor $Q_1$ and the amplifier's output point a, namely the connecting point of the emitters of the output transisters $Q_1$ and $Q_2$, is connected to the point U of the three-phase delta-shaped circuit. Similarly, $Q_4$, $Q_5$ and $Q_6$ respectively are the transistors composing the second complementary amplifier, with the output of the magnetic induction element 52 being fed into the base terminal of the input transistor $Q_4$ and the amplifier's output point b being connected to the point V of the three-phase delta-shaped circuit. $Q_7$, $Q_8$ and $Q_9$ respectively are the transistors composing the third complementary amplifier, with the output of the magnetic induction element 53 being fed into the base terminal of the input transistor $Q_7$ and the amplifier's output point C being connected to the Point W of the three-phase delta-shaped circuit. 55 is the velocity detector which detects the speed of the rotor M, and 54 is the velocity control circuit which controls the input voltage to each complementary amplifier in accordance with the detected velocity signals. Further, $R_1$, $R_3$, $R_4$, $R_6$, $R_7$ and $R_9$ respectively are the resistors which are inserted in the respective positions as illustrated.

Figure 10:
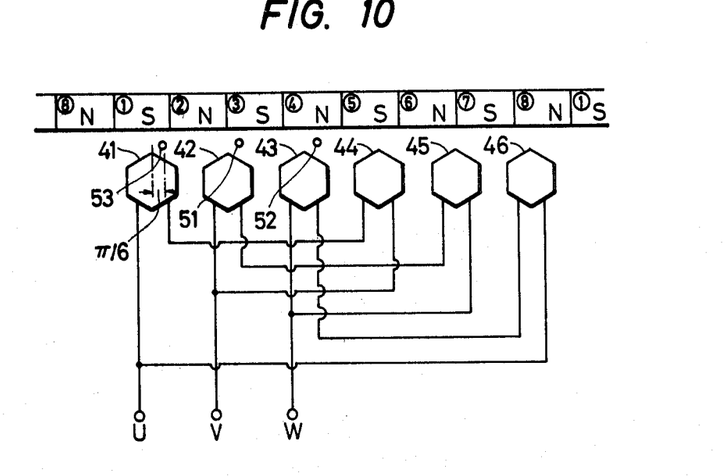
FIG. 10 is a development chart showing the relations among the positions of the rotor magnet's magnetic poles, connection of stator's coils and the arranged positions of magnetic induction elements in FIG. 9.
Figure 11:
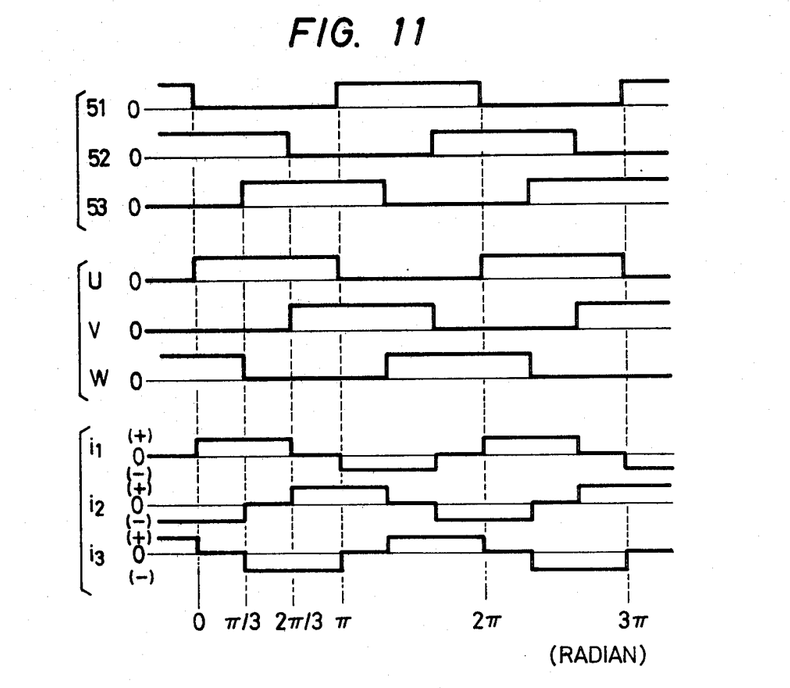
FIG. 11 is a drawing showing the relations of magnetic induction element output, coil terminal voltage and coil current with the rotating angle of the rotor magnet in FIG. 9.

FIG. 10 is a developed chart exhibiting the relative relations between the positions of respective magnetic poles ①, ②, ... ⑧ which are magnetized on the eight poles of the rotor magnet 3, the connection of the stator coil 4 and the magnetic induction elements 51 through 53, and FIG. 11 is the chart showing the relations of the output of the magnetic induction elements of each phase, the coil terminal voltage and the coil current with the rotating angle of the rotor magnet 3, with the arrow direction as shown in FIG. 9 being plus as regards the plus/minus of the coil current.

According to the circuit structure of FIG. 9 example, it facilitates a 120° current flow without employing a complicated logic circuit and it makes available a motor with less torque ripple.

Moreover, as to the structure of the motor shown in FIG. 6, in the conventional D.C. brushless motor the revolving movement of the rotor generates eddy current within the stator yoke 6 which acts in reverse to the revolving movement of the rotor as electromagnetic iron or silicon steel plate was used as the material for the stator yoke, so that an excess current flowing in the proportion equivalent to oppose such reverse force cuts down the motor's efficiency. In a conventional case of using the motor as the driving source of a record player, however, low-priced cold strip steel plates were employed attaching much importance to the manufacturing cost rather than its efficiency as the magnitude of the iron loss generated in the stator yoke was negligible on account of the revolution speed of as low as 33⅓ r.p.m. or 45 r.p.m.

As against this, in the motor used for the magnetic disc driving system its revolution speed is more than 100 times speedier, for example about 3,600 r.p.m., as compared to the motor for a record player, and as the core loss is proportional to the square of the frequency of the passing magnetic flux, the magnitude of the core loss will be $100^2 = 10,000$ times the loss in a record player which is in no way negligible. In the present invention, therefore, a mildly magnetic ferrite material which holds a high electric resistance even at a high frequency is used for the stator yoke 6. By this the present invention reduces the core loss at the stator yoke 6 with a wide margin, or as much as 40% as compared to the stator yoke 6 made of cold strip steel plate.

Figures 12, 13:
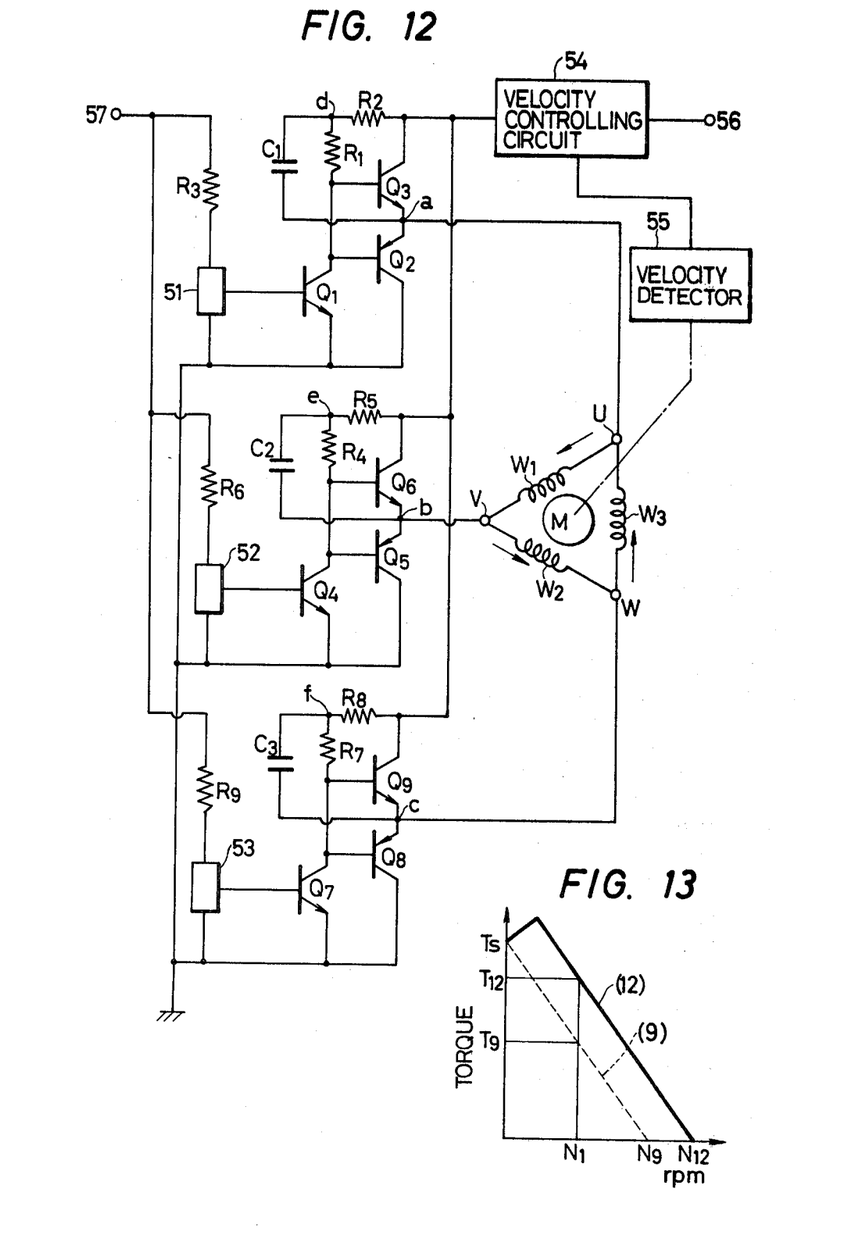
FIG. 12 is a driving circuit chart showing another example of the present invention.
FIG. 13 is a chart comparing the relations between the rotor axle's revolution and the output torque of the circuits showed in FIG. 9 and FIG. 12 respectively.

FIG. 12 is a driving control circuit chart exhibiting another example of the present invention. The differing point of FIG. 12 example from FIG. 9 example is the additional installation of the resistances $R_2$, $R_5$ and $R_8$ and the condensers $C_1$, $C_2$ and $C_3$. In other words, as for the first complementary amplifier, the point is the structure where the collector of the NPN type transistor $Q_3$ on the output side and the base is connected by means of the series connection circuit of two resistances $R_2$ and $R_1$, and the midway connecting point d of these resistances $R_1$ and $R_2$ is connected to the output point a by way of the condenser $C_1$ (namely, the connecting point of each emitter point of the NPN type transistor $Q_3$ and the PNP type transister $Q_2$ connected in cascade). The second and the third complementary amplifiers also have the same structure.

Here an explanation is made as to the performance of the complementary amplifier employed in the driving circuit of the present invention. First, the amplifier shown in FIG. 9 performs as follows. In the first circuit, when there is a plus output from the magnetic induction element 51, the transistor $Q_1$ is "on", so that the transister $Q_2$ is "on" and the transistor $Q_3$ is "off". When there is no plus output from the magnetic induction element 51, the transistor $Q_1$ is "off", $Q_2$ is also "off" and $Q_3$ is "on". The second and the third circuit also perform in a similar way, and the relations by this performance of the output of the magnetic induction element of each phase, the terminal voltage of the stator coil and the coil current with the rotation angle of the rotor are shown in FIG. 11. In FIG. 11, taking the point of time where the angle is 0°, the output of the magnetic induction element 51 is 0, 52 has a plus output and the output of 53 is 0, so that the "on"/"off" relations of the transistors of each phase are that in the first phase $Q_1$ and $Q_2$ are "off" while $Q_3$ is "on", in the second phase $Q_4$ and $Q_5$ are "on" while $Q_6$ is "off", and in the third phase $Q_7$ and $Q_8$ are "off" while $Q_9$ is "on". Accordingly, of the terminals of the stator coil both U and W are at the high electric potential and V is at the earthing electric potential, so that the current $i_1$ flows through the stator coil $W_1$ in the plus direction and through $W_2$ the current $i_2$ flows in the minus direction, while at $W_3$ V and W are at the equal electric potential which makes no current flow so $i_3 = 0$, and this status is kept until the angle advances from 0° to $\pi/3$. Studying the voltage drop at the circuit of the transistors $Q_1$, $Q_2$ and $Q_3$, when $Q_1$ and $Q_2$ are "off" while $Q_3$ is "on", the voltage drop $V_1$ of $Q_3$ is $V_1 = i_B(Q_3) \cdot R_1 + V_{BE}(Q_3)$, and on the other hand at the same point of time in the second phase when $Q_4$ and $Q_5$ are "on" while $Q_6$ is "off", the voltage drop $V_2$ of the $Q_4 \cdot Q_5$ circuit is $V_2 = V_{CE}(SAT)(Q_4) + V_{BE}(Q5)$. Comparing $V_1$ and $V_2$, as for $V_1$ the driving of the transistor $Q_3$ is not yet up to a saturating range, so that it is known that $V_1$ is larger as compared to $V_2$, and this fact cuts down the amplifier's efficiency. In contrast to this, in the circuit structure of FIG. 12, it contrives to highten the amplifier's efficiency by inserting a condenser whereby when the transistor $Q_3$ turns from "off" to "on" a large excitative current which flows the base of $Q_3$ saturates $Q_3$ and lessens the voltage drop of $Q_3$ circuit. The performance of this circuit is dealt with hereunder in more detail. Taking the status where the point is slightly at the left of the 0° point in FIG. 11, the output of the magnetic induction element 51 is on the plus and the transistors $Q_1$ and $Q_2$ are "on" while $Q_3$ is "off". At this stage, the voltage of $$V_c = \frac{V_{cc}}{2}\left(\frac{R_1}{R_1 + R_2}\right)$$

is charged into the condenser $C_1$. In the above equation, $V_{cc}$ is the voltage of the power source. Next, when the angle comes to 0° as the rotation of the rotor advances, the output of the magnetic induction element 51 comes to 0 and $Q_1$ and $Q_2$ are "off" while $Q_3$ comes to "on", but at this point, the electric potential at the point d is $$V_{cc} + \frac{V_{cc}}{2}\left(\frac{R_1}{R_1 + R_2}\right)$$

as the charged-in voltage from the condenser $C_1$ is added on top of the power source voltage of $V_{cc}$, the base electric potential is highened to over the collector's electric potential $V_{cc}$, $Q_3$ is excited until it becomes completely saturated, the voltage drop $V_1$ of $Q_3$ circuit becomes $V_1 = V_{CE}(SAT)(Q_3)$, with an improved efficiency of the amplifier, which proves that there is the difference shown in FIG. 13 between the FIG. 9 circuit and the FIG. 12 circuit even if both are operated under the identical power source voltage $V_{cc}$. In FIG. 13, the abscissa represents rotation while the ordinate represents torque. The curve expressed by a broken line (9) is the curve of torque-rotation of FIG. 9 circuit, whereas the curve expressed by a solid line (12) is the curve of torque-rotation of FIG. 12 circuit. In the case of FIG. 12, the torque at the related rotation $N_1$ increases to $T_{12}$ over $T_9$. On the other hand, this increase of output occurs at the time when the condenser $C_1$ performs charging or discharging while the transistors $Q_1$ and $Q_2$ and the transistor $Q_3$ switch "on" and "off" in turn as the rotor rotates, and when the rotor is in standstill the transistor $Q_3$ is unsaturated and the current reduces its flow so that the torque becomes lessened. This feature can also be used as a means to prevent heating or burning of the coil when the free revolving movement of the driving axle of the motor is restricted by some reason.

As explained in the foregoing, the present invention has, as it is the system driving direct the driving axle of the device to be driven by the driving axle of the D.C. brushless motor, such advantages as that there is no need to effect any mechanical modification in accordance with the frequency of current which was the problem in the conventional system, the rotation reaches the stabilized rotation speed quickly after its start up, no dust is generated by the wear of the belt, it is of high performance while it is so compact, and in addition not much is required for its maintenance. Furthermore, as a driving circuit it is an exceedingly simple circuit format, which facilitates prevention of uneven torque derived from the reverse torque that was the problem in the conventional circuits. Also by employing ferrite material which exhibits a high resistant value in high frequency for the stator yoke of the motor, it facilitates reducing the vortex current loss even in a case where the present invention is applied to a magnetic disc driving system which rotates at a high speed, and brings about the effect of improving the motor's operational efficiency.

In the example cited herein, for the sake of the conveniency of explanation, the explanation is only limited to the case where the driving axle is held in the vertical direction, but the present invention has no restriction in the direction of the axle and it is also applicable to any use where the driving axle of the motor is placed in a horizontal direction or at any inclination.

What we claim is:

1. A drive system for a D.C. brushless motor comprising:
    a motor base;
    a rotor shaft pivotally mounted in said motor base;
    rotor magnets operatively connected to said rotor shaft for rotation therewith and equiangularly spaced thereabout;
    stator windings insulatively mounted to said motor base and equiangularly arranged about said rotor shaft, said stator windings being spaced from said rotor magnets by an air gap, said stator windings numbering 3N where N is an integer and being wired into first, second and third winding groups connected in a delta configuration;
    first, second and third magnetic induction means for monitoring the magnetic field produced by the rotation of said rotor shaft and magnets and producing respective outputs upon the detection of positive values, each of said first, second and third magnetic induction means being mounted to said motor base in a position $\pi/6$ radians advanced in the direction of motor rotation from the center of a winding of a respective first, second or third winding group;
    amplifier means connected to said first, second and third magnetic induction means for amplifying said detected outputs to apply current to said stator windings groups.

2. The motor drive system of claim 1 further comprising:
    a stator yoke mounted to said motor base for support of said stator windings, said stator yoke being constructed out of a ferrite material having high electrical resistivity and high magnetic permeability.

3. The motor drive system of claim 1 wherein said amplifier means includes first, second and third amplifiers connected to said first, second and third magnetic induction means, respectively and applying current to said stator winding groups;
    each said amplifier including;
        a first NPN type transistor having a base terminal for receiving the output of a respective magnetic induction means, an emitter terminal being grounded and a collector terminal being connected to a source voltage via a first resistor;
        a PNP type transistor having a base terminal connected to the collector terminal of said first NPN type transistor, a collector terminal being grounded; and
        a second NPN type transistor having a base terminal connected to the collector terminal of said first transistor and a collector terminal connected to said source voltage;
        said emitter terminals of said PNP type transistor and said second NPN type transistors being connected together and forming an output terminal of said amplifier connected to said stator windings.

4. The motor drive system of claim 3 wherein said collector terminal of second NPN type transistor is also connected through a second resistor to a midway connecting point to which the collector of said first NPN type transistor is also connected through said first resistor;
    said midway connecting point being connected to the output terminal of said amplifier via a capacitor.

* * * * *